No. 822,689. PATENTED JUNE 5, 1906.
B. OBEAR.
AIR COMPRESSOR.
APPLICATION FILED NOV. 28, 1904.

4 SHEETS—SHEET 1.

WITNESSES
A. J. McCauley
Edgar T. Farmer

INVENTOR:-
Bryan Obear
BY Bakewell & Cornwall
ATT'Y'S.

No. 822,689. PATENTED JUNE 5, 1906.
B. OBEAR.
AIR COMPRESSOR.
APPLICATION FILED NOV. 28, 1904.

4 SHEETS—SHEET 2.

WITNESSES
a.j. McCauley.
Edgar T Farmer.

INVENTOR:-
Bryan Obear
BY Bakewell + Cornwall
ATT'YS.

No. 822,689. PATENTED JUNE 5, 1906.
B. OBEAR.
AIR COMPRESSOR.
APPLICATION FILED NOV. 28, 1904.
4 SHEETS—SHEET 3.
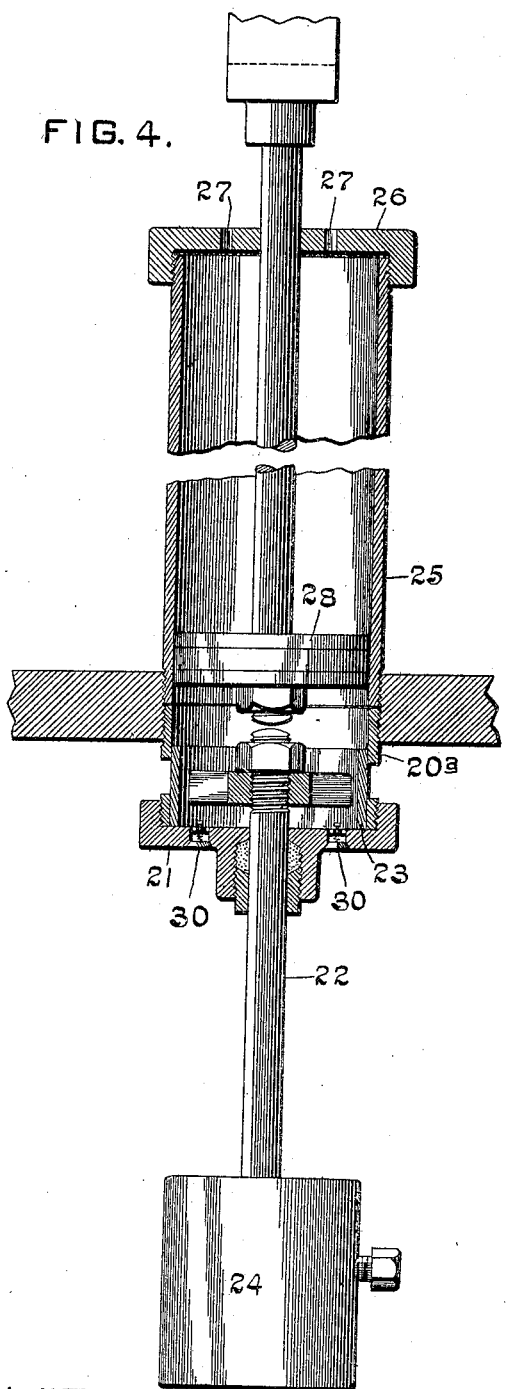
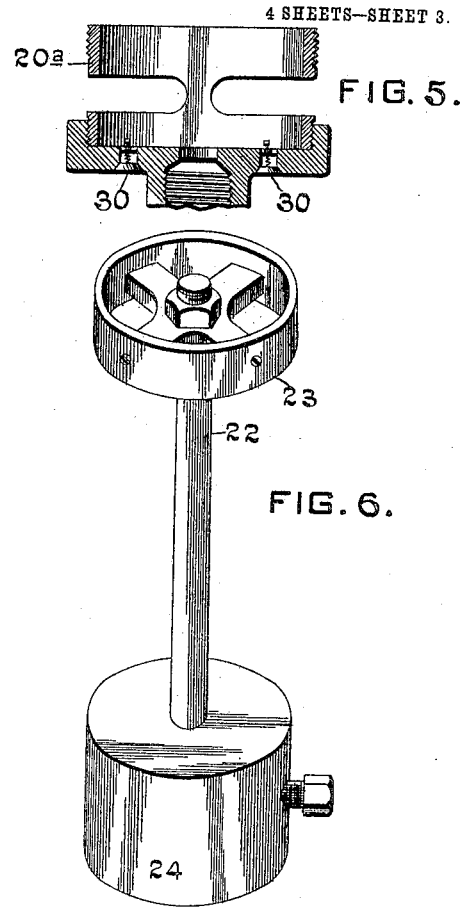
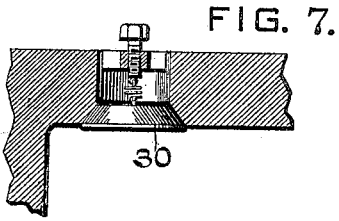
WITNESSES
A. J. McCauley.
Edgar T. Farmer.
INVENTOR:—
Bryan Obear
BY Bakewell Cornwall
ATTYS

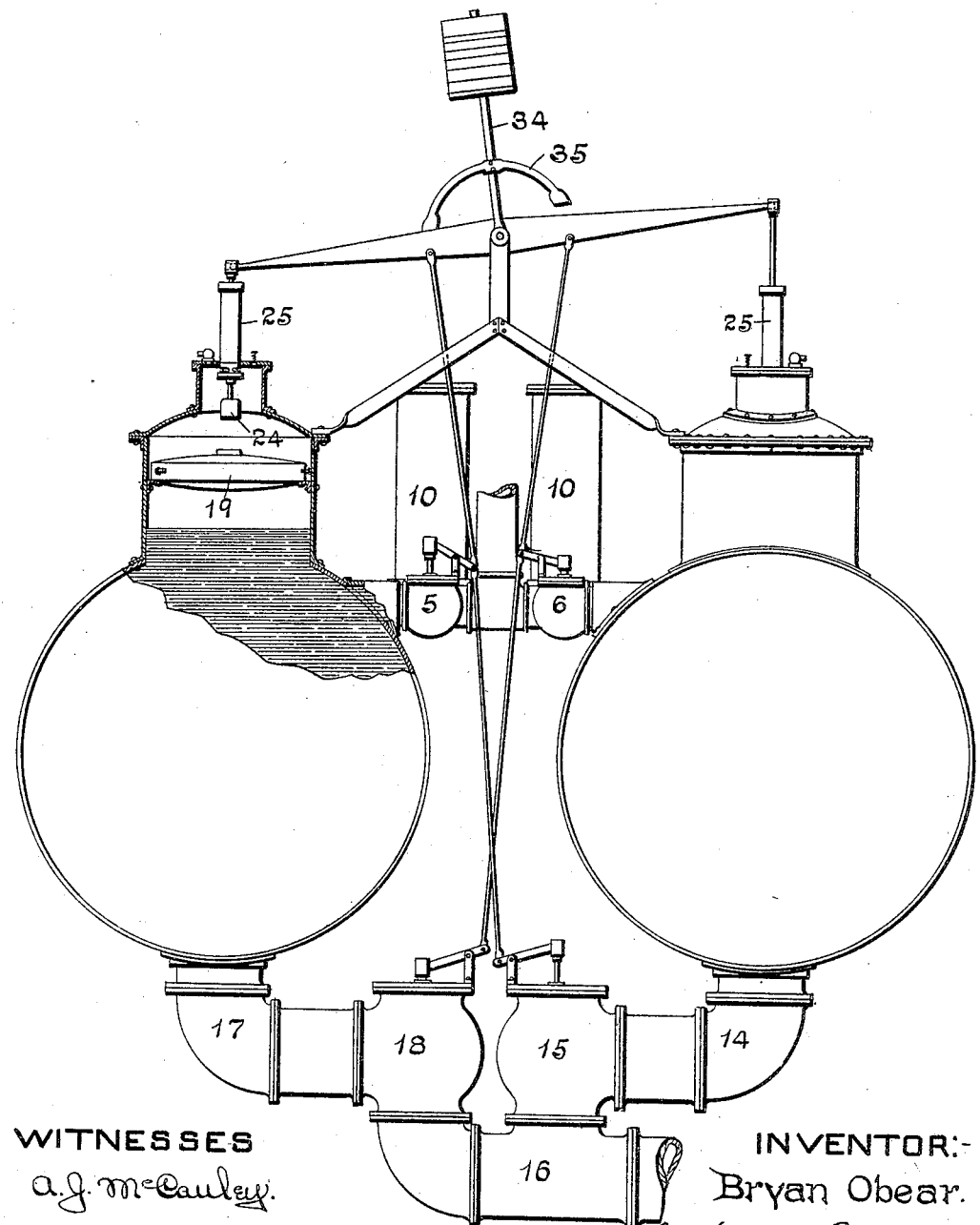

UNITED STATES PATENT OFFICE.

BRYAN OBEAR, OF ST. LOUIS, MISSOURI, ASSIGNOR TO MONTAGUE COMPRESSED AIR COMPANY OF MISSOURI, OF ST. LOUIS, MISSOURI, A CORPORATION OF MISSOURI.

AIR-COMPRESSOR.

No. 822,689.   Specification of Letters Patent.   Patented June 5, 1906.

Application filed November 28, 1904. Serial No. 234,615.

*To all whom it may concern:*

Be it known that I, BRYAN OBEAR, a citizen of the United States, residing at St. Louis, Missouri, have invented a certain new and useful Improvement in Air-Compressors, of which the following is a full, clear, and exact description, such as will enable others skilled in the art to which it appertains to make and use the same, reference being had to the accompanying drawings, forming part of this specification, in which—

Figure 1:
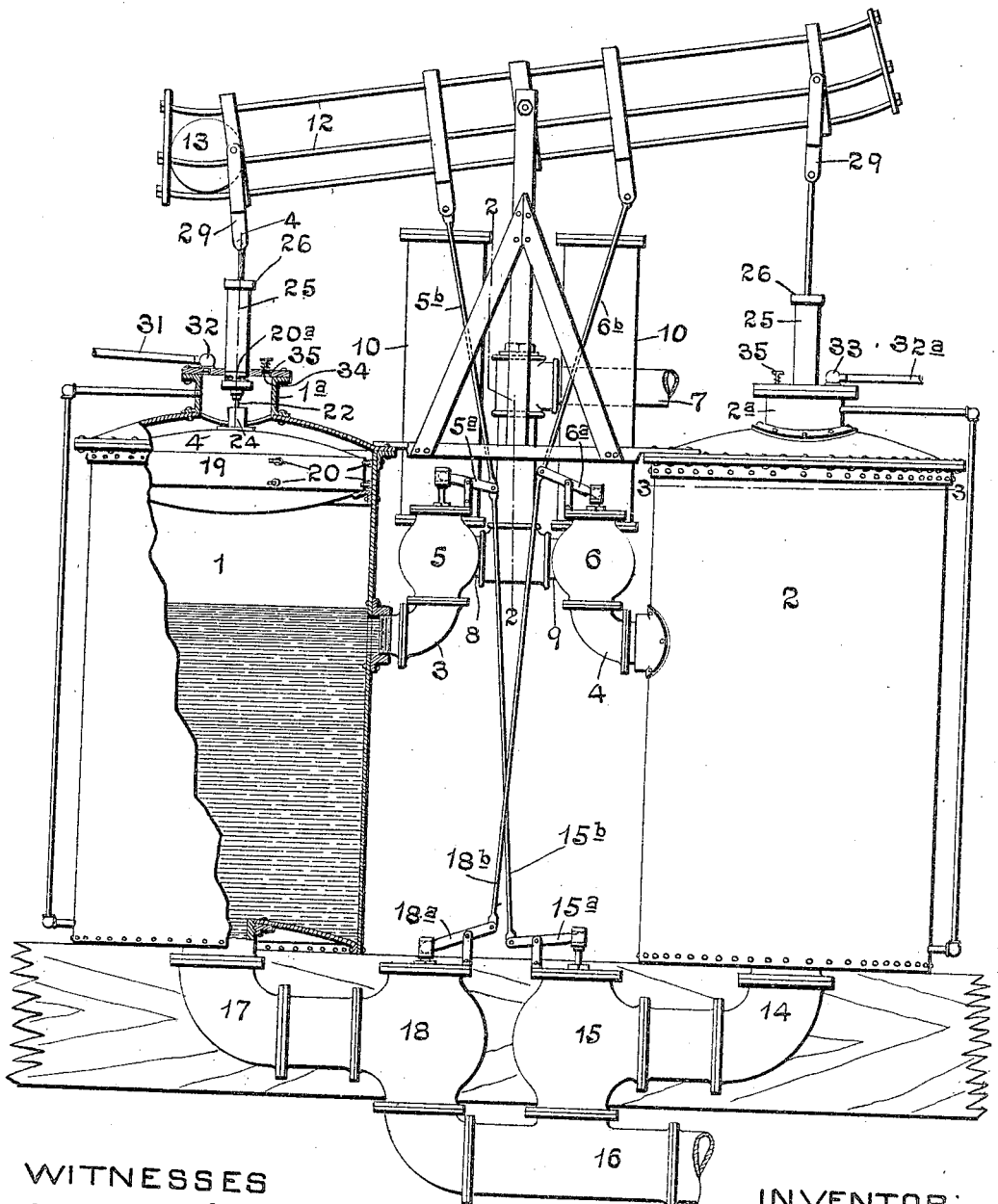
Figure 2:
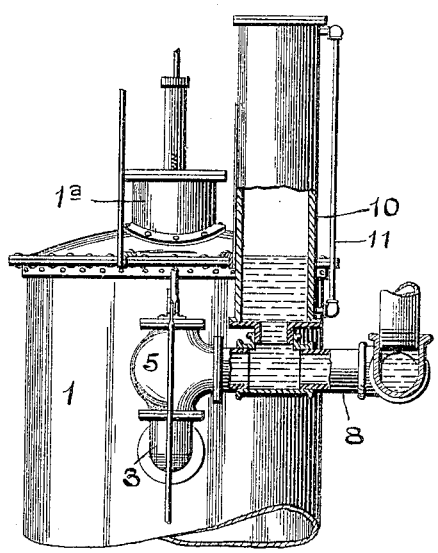
Figure 3:
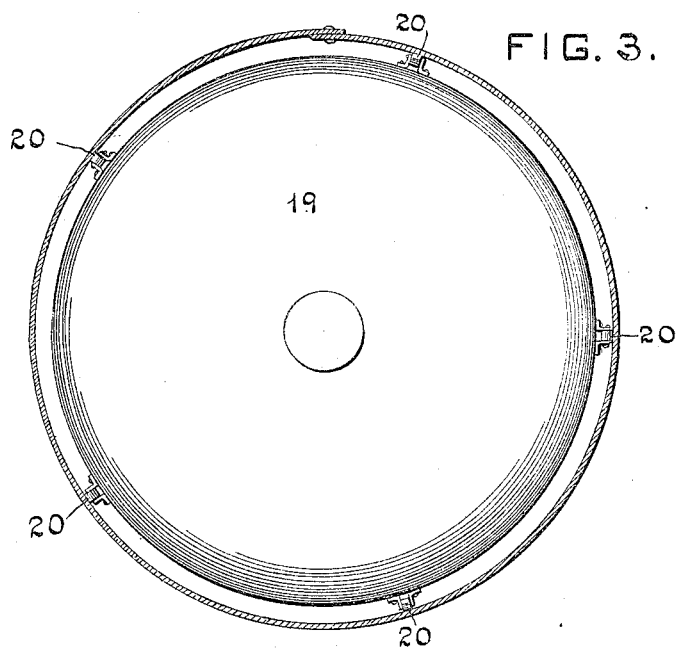

Figure 1 is a side elevational view of my improved apparatus, one of the cylinders being partly in section. Fig. 2 is a detail view, partly in section, taken on line 2 2 of Fig. 1. Fig. 3 is a sectional view on line 3 3 of Fig. 1. Fig. 4 is a sectional view on line 4 4 of Fig. 1. Fig. 5 is a detail view of the valve-casing. Fig. 6 is a detail view of the weighted valve. Fig. 7 is an enlarged detail view of one of the relief-valves, and Fig. 8 is a modified form of apparatus.

This invention relates to a new and useful improvement in water-motors, the object being to utilize the pressure or head of flowing water to compress air, which compressed air is preferably stored in a suitable reservoir or tank in readiness for use for various purposes where it can be employed to advantage.

My invention consists in the novel details of construction, arrangement, and combination of the several parts, all as is hereinafter more fully described, and specifically pointed out in the claims.

In the drawings, 1 and 2 indicate tanks into which water is alternately admitted through pipes 3 and 4, said pipes being controlled by valves 5 and 6. Water under pressure from a water-main or some other suitable source of water-supply enters the apparatus through the pipe 7, which is connected by a T to branch pipes 8 and 9, leading, respectively, to the valves 5 and 6. Each one of these branch pipes 8 and 9 is provided with an upright cylinder 10 in communication therewith. Said cylinders are in communication with the branch pipes 8 and 9 adjacent to the valves 5 and 6. Thus it will be seen that when the valves 5 and 6 are closed or are in the act of closing the shock due to the pressure of the water passing through the pipe 7 into the branch pipes 8 and 9 will be relieved because the water may pass up into the cylinders 10, and while compressing the air said shock will be cushioned and the pressure equalized at this point. These cylinders 10 may be designated as equalizing-cylinders, and each is preferably provided with a water-gage 11 in order to determine the height of the water therein, (as each cylinder will collect water resulting from the pressure and compress the air above the water for equalizing the strain on the valves in the cut-off.) The valves 5 and 6 are operated by levers 5$^a$ and 6$^a$, to which levers are connected rods 5$^b$ and 6$^b$, respectively, said rods in turn being connected to a walking-beam 12. This walking-beam, as shown in Fig. 1, is in the form of a skeleton frame providing a runway in which is located a moving weight 13. When the parts are in the position shown in Fig. 1, the valve 5 is open and water from pipe 7 enters the cylinder 1, and valve 6 is closed. The water from cylinder 2 passes out through a pipe 14 and beyond a valve 15 and is discharged into a pipe 16, where it is led off into a suitable tank or other receptacle for use. Valve 15 is provided with a lever 15$^a$, which is connected by a rod 15$^b$ to the valve-operating lever 5$^a$. Thus when valve 5 is opened to admit water into cylinder 1 valve 15 is opened to exhaust the water from cylinder 2. Cylinder 1 is likewise provided with a discharge-pipe 17, which is controlled by a valve 18, the water passing beyond valve 18 into the pipe 16. Valve 18 is operated by a lever 18$^a$, connected by a rod 18$^b$ to the lever 6$^a$, which operates the valve 6. When valve 6 is closed to shut off the supply of water from cylinder 2, valve 18 is likewise closed, so that the water entering cylinder 1 may accumulate therein and by its pressure compress the air in cylinder 1. Each of the cylinders 1 and 2 is provided with a float which operates a valve to admit pressure under a piston connected to the walking-beam. One of these floats is shown in Fig. 1 at 19 and consists of a hollow body having guide-rollers 20 at its side. (See Fig. 3.) The cylinders 1 and 2 are provided with domes 1$^a$ and 2$^a$, respectively, in the top of which domes, as shown in Figs. 4 and 5, is secured a valve-casing 20$^a$. This valve-casing is provided with ports in its side walls and at its lower end is closed by a cap 21, which is provided with a stuffing-box to guide a valve-stem 22. This valve-stem carries a valve 23 at its upper end which is designed to control the ports of the valve, said stem also having a weight 24 at its lower end which is designed to be struck by the float in the upward movement of said float, the upward movement of the valve eventually opening the ports in the valve-casing 20$^a$. Valve 23 is secured by means of a spider to the stem 22, so that the compressed air entering under the valve 23 may pass upwardly therethrough.

25 indicates a cylinder located in vertical alinement with the valve-casing 20$^a$, said cylinder having a head 26 at its upper end provided with openings 27, which openings compensate for the displacement of air above the piston 28, operating in the cylinder 25. The rod of this piston 28 is connected to a yoke 29, which yoke in turn is pivotally connected to the cradle or walking-beam 12. The cap 21 on the valve-casing is provided with inwardly-opening check-valves 30.

The operation of the device is as follows: As before stated, valves 5 and 15 are open. Valves 6 and 18 are closed. The water is thus entering cylinder 1 and leaving cylinder 2. As the water rises in cylinder 1 it will compress the air above it, and eventually the float 19 will be raised, which float, contacting with the weight 24, will lift the valve 23, the upward movement of said valve first striking the piston 28 and arresting temporarily a continuation of the upward movement of the parts until the water under the float 19 has accumulated to such an extent that the weight of its displacement exceeds the weight imposed upon the float 19, when said float will continue rising, carrying with it the valve 23, the piston 28, and the walking-beam to which it is connected. As the lower edge of the valve 23 passes the port-openings in the valve-casing 20$^a$ the air which has been compressed in the dome will enter the cylinder 25 under the piston 28 and raise said piston, causing the weight 13 to roll down the runway and throw the walking-beam by a quick movement. The air which has been compressed in cylinder 1 passes out through a pipe 31 into a reservoir or other storage-tank, said pipe being controlled by an outwardly-opening check-valve 32, which prevents the air from the reservoir escaping back into the cylinder 1. The throwing of the walking-beam reverses the positions of the valves 5, 6, 18, and 15—*i. e.*, the valve 5 is closed and the valve 18 opened to permit the water from tank 1 to pass into the discharge-pipe 16. Valve 6 is opened and valve 15 closed, so that the water enters tank 2 and rises therein, the compressed air escaping through a pipe 32$^a$ into the reservoir and beyond a check-valve 33, which controls said pipe. The water eventually rises and raises the float in tank 2 and throws the walking-beam, as before described. The purpose of the inwardly-opening check-valves 30 is to permit the air under the piston 28 to escape upon the descent of said piston when the walking-beam is thrown.

In Fig. 8 I have shown a modified form of apparatus in which the tanks are placed horizontally, the domes being provided as above described. In this form instead of the walking-beam being in the form of a runway or moving way I make the walking-beam solid, and in order to quickly throw the same from one position to the other I mount a weighted lever 34 on the pivotal point on the walking-beam and arrange arms 35 on said weighted lever, whereby as the lower end of the walking-beam is raised the weighted lever 34 will be moved until the center of gravity is placed on the opposite side of the pivotal point, when said lever, acting under the force of gravity, will swing until its lower arm 35 engages the walking-beam and forces the low side of the walking-beam down with a quick motion. In other respects the apparatus is the same as that shown in Figs. 1 to 7.

It is to be understood that when the water recedes in the tanks 1 and 2 air will accumulate therein through the openings 34, normally closed by the check-valves 35 in the domes of the respective tanks 1 and 2. This is due to the fact that when the water recedes a vacuum is formed in each of the respective tanks, causing the valves 35 to open inwardly to admit the air, and after a sufficient quantity of the air has been admitted the valves will be automatically closed by their springs.

I am aware that minor changes in the construction, arrangement, and combination of the several parts of my device can be made and substituted for those herein shown and described without in the least departing from the nature and principle of my invention.

Having thus described my invention, what I claim as new, and desire to secure by Letters Patent, is—

1. The combination with a compression-tank and valves controlling the admission to and exhaust therefrom of the motive fluid, of a float in the tank, a piston connected to the controlling-valves, and a weighted valve in the path of movement of the float and arranged to first engage and initially lift the piston and afterward admit beneath the same compressed air from the tank; substantially as described.

2. In an apparatus of the class described, the combination with a compression-tank and valves controlling the admission to and exhaust therefrom of the motive fluid, of a float in said tank, a piston connected to the controlling-valves, and the valve 23 having a stem in the path of movement of the float, and arranged to first engage and initially lift the piston and afterward admit beneath the same compressed air from the tank; substantially as described.

3. In an apparatus of the class described, the combination with a compression-tank and valves controlling the admission to and exhaust therefrom of the motive fluid, of a float arranged in said tank, a cylinder above the tank and in communication therewith, a piston 28 arranged in said cylinder, a valve 23 in the cylinder adapted to be actuated by the movement of the float in one direction to permit air to enter the cylinder for actuating the piston, and check-valves 30 in the bottom of the cylinder to permit the air to exhaust from the cylinder when the piston moves in the opposite direction; substantially as described.

4. In an apparatus of the class described, the combination with two tanks each having a dome, valves controlling the admission and exhaust therefrom of the motive fluid, and a cylinder above each dome, of a float in each tank, pistons connected to the controlling-valves and movable in the cylinders, and weighted valves in the path of movement of the floats and arranged to first engage and initially lift the pistons and afterward admit beneath the same compressed air from the tank; substantially as described.

5. An apparatus of the class described, comprising two tanks, a fluid-supply pipe for each tank, each tank being provided with a valve for admitting liquid into the tank and a valve for permitting the liquid to exhaust from said tank, a walking-beam, connections between said walking-beam and the valves of each tank, and a cylinder in communication with each supply-pipe for absorbing the shock resulting from the closure of the admission-valves; substantially as described.

In testimony whereof I hereunto affix my signature, in the presence of two witnesses, this 26th day of November, 1904.

BRYAN OBEAR.

Witnesses:
  B. F. FUNK,
  GEORGE BAKEWELL.